United States Patent
Kofkin-Hansen et al.

(10) Patent No.: US 9,875,144 B2
(45) Date of Patent: *Jan. 23, 2018

(54) CONTROLLING VIRTUAL MACHINE DENSITY AND PLACEMENT DISTRIBUTION IN A CONVERGED INFRASTRUCTURE RESOURCE POOL

(71) Applicant: International Business Machines Corporation, Armonk, NY (US)

(72) Inventors: Simon J. Kofkin-Hansen, Cary, NC (US); Richard T. Lemelin, South Portland, ME (US); Setareh Mehrabanzad, Easton, MD (US); Shawn P. Raess, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/919,766

(22) Filed: Oct. 22, 2015

(65) Prior Publication Data

US 2017/0046206 A1   Feb. 16, 2017

Related U.S. Application Data

(63) Continuation of application No. 14/826,510, filed on Aug. 14, 2015.

(51) Int. Cl.
*G06F 9/455* (2006.01)
*G06F 9/46* (2006.01)
*G06F 9/50* (2006.01)

(52) U.S. Cl.
CPC .......... *G06F 9/5077* (2013.01); *G06F 9/455* (2013.01); *G06F 9/45533* (2013.01);
(Continued)

(58) Field of Classification Search
None
See application file for complete search history.

(56) References Cited

U.S. PATENT DOCUMENTS

2010/0269109 A1* 10/2010 Cartales ............... G06F 9/5072
   718/1
2013/0042123 A1* 2/2013 Smith .................. G06F 9/5094
   713/300

(Continued)

OTHER PUBLICATIONS

List of IBM Patents or Patent Applictions Treated as Related; (Appendix P), Filed Oct. 22, 2015, 2 pages.

(Continued)

*Primary Examiner* — Charles Swift
(74) *Attorney, Agent, or Firm* — Cantor Colburn LLP; Steven Meyers (57) ABSTRACT

Aspects include identifying physical resources in a computer environment, allocating virtual resources to the physical resources, and aggregating the virtual resources, as a virtual resource pool, at a per virtual machine level in the computer environment. Other aspects include evaluating the virtual resources in the virtual resource pool against resource pool domain constraints, and determining a resource allocation adjustment as a function of the evaluating. The resource allocation adjustment is configured to achieve a maximum specified virtual machine density.

6 Claims, 6 Drawing Sheets

(52) U.S. Cl.
CPC ............ *G06F 9/45558* (2013.01); *G06F 9/50* (2013.01); *G06F 9/5027* (2013.01); *G06F 9/5061* (2013.01); *G06F 9/5072* (2013.01); *G06F 9/5083* (2013.01); *G06F 2009/4557* (2013.01); *G06F 2009/45579* (2013.01); *G06F 2009/45583* (2013.01); *G06F 2009/45591* (2013.01); *G06F 2009/45595* (2013.01); *G06F 2209/5011* (2013.01)

(56) References Cited

U.S. PATENT DOCUMENTS

| | | | | |
|---|---|---|---|---|
| 2013/0198637 | A1* | 8/2013 | Childers, Jr. | H04L 41/5032 715/735 |
| 2013/0275975 | A1* | 10/2013 | Masuda | G06F 9/5077 718/1 |
| 2014/0032761 | A1* | 1/2014 | Beveridge | G06F 9/5011 709/226 |
| 2014/0082201 | A1* | 3/2014 | Shankari | H04L 47/70 709/226 |
| 2014/0082612 | A1* | 3/2014 | Breitgand | G06F 9/45533 718/1 |
| 2014/0089917 | A1* | 3/2014 | Attalla | G06F 9/455 718/1 |
| 2014/0137104 | A1* | 5/2014 | Nelson | G06F 9/45558 718/1 |
| 2014/0137110 | A1* | 5/2014 | Engle | G06F 9/5022 718/1 |
| 2014/0143516 | A1* | 5/2014 | Dawson | G06F 12/0253 711/171 |
| 2014/0164619 | A1* | 6/2014 | Zhu | G06F 9/45558 709/226 |
| 2014/0189109 | A1* | 7/2014 | Jang | H04L 67/10 709/224 |
| 2014/0208317 | A1* | 7/2014 | Nakagawa | G06F 9/45533 718/1 |
| 2014/0223096 | A1* | 8/2014 | Zhe Yang | G06F 12/0871 711/114 |
| 2014/0331222 | A1* | 11/2014 | Zheng | G06F 9/45558 718/1 |
| 2015/0040131 | A1* | 2/2015 | Shan | G06F 9/5027 718/1 |
| 2015/0286494 | A1* | 10/2015 | Yan | G06F 9/45558 718/1 |
| 2015/0341230 | A1* | 11/2015 | Dave | H04L 41/5058 705/7.29 |
| 2015/0378765 | A1* | 12/2015 | Singh | G06F 9/45558 718/1 |
| 2016/0036632 | A1* | 2/2016 | Tanigawa | G06F 11/3442 709/220 |
| 2016/0098297 | A1* | 4/2016 | Yuyitung | G06F 11/3442 718/104 |
| 2016/0139948 | A1* | 5/2016 | Beveridge | G06F 9/45558 718/1 |
| 2016/0182293 | A1* | 6/2016 | Di Benedetto | H04L 41/0816 709/221 |

OTHER PUBLICATIONS

Simon J. Kofkin-Hansen, et al., Pending U.S. Appl. No. 14/826,510 entitled "Controlling Virtual Machine Density and Placement Distribution . . . ," filed with the U.S. Patent and Tradmark Office on Aug. 14, 2015.

* cited by examiner

CONTROLLING VIRTUAL MACHINE DENSITY AND PLACEMENT DISTRIBUTION IN A CONVERGED INFRASTRUCTURE RESOURCE POOL

DOMESTIC PRIORITY

This application is a continuation of U.S. patent application Ser. No. 14/826,510, filed Aug. 14, 2015, the content of which is incorporated by reference herein in its entirety.

BACKGROUND

The present invention relates to computer resource management, and more specifically, to controlling virtual machine density and placement distribution in a converged infrastructure resource pool.

A contemporary virtual machine (VM) is a software implementation of a machine (i.e., a computer) that executes programs like a physical machine. The VM typically emulates a physical computing environment, but requests for central processing unit (CPU), memory, hard disk, network and other hardware resources are managed by a virtualization layer which translates these requests to the underlying physical hardware. VMs are created within a virtualization layer, such as a hypervisor or a virtualization platform that runs on top of a client or server operating system. The virtualization layer is typically used to create many individual, isolated VMs within a single, physical machine. Multiple VMs are typically used in server consolidation, where different services that were previously run on individual machines are instead run in isolated VMs on the same physical machine.

A persistent challenge to providers of cloud hosting and other network management services is the efficient use of system resources. Efficient allocation of VMs to different network nodes, e.g., network servers, is desired in order to maximize the use of network resources and reduce the number of physical servers and/or physical resources required to provide computing services to customers. Modern virtual machine management software seeks either consolidation of VMs for power savings or load-balancing for performance.

SUMMARY

According to one embodiment of the present invention, a method for controlling virtual machine density and placement distribution in a converged infrastructure resource pool is provided. The method includes identifying physical resources in a computer environment, allocating virtual resources to the physical resources within a model, and aggregating the virtual resources, as a virtual resource pool, at a per virtual machine level in the computer environment. The method also includes evaluating the virtual resources in the virtual resource pool against resource pool domain constraints, and determining a resource allocation adjustment as a function of the evaluating, wherein the resource allocation adjustment is configured to achieve a maximum specified virtual machine density.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments are directed to controlling virtual machine (VM) density and placement distribution within a converged infrastructure resource pool. Existing methods for determining or controlling the sizing of individual VMs has focused on one set of physical resource characteristics from within infrastructure siloes. With the advent of converged infrastructure solutions and the ability to create virtualized dynamic infrastructure resource pools, there is a need to access characteristics, capabilities and capacity across all of the resources within the pool from a holistic point of view. The embodiments described herein provide an infrastructure and methodology for calculating VM placement, VM size distribution, and VM density based on an automated algorithm that senses the combined physical and virtual resource capacity within a converged infrastructure resource pool.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
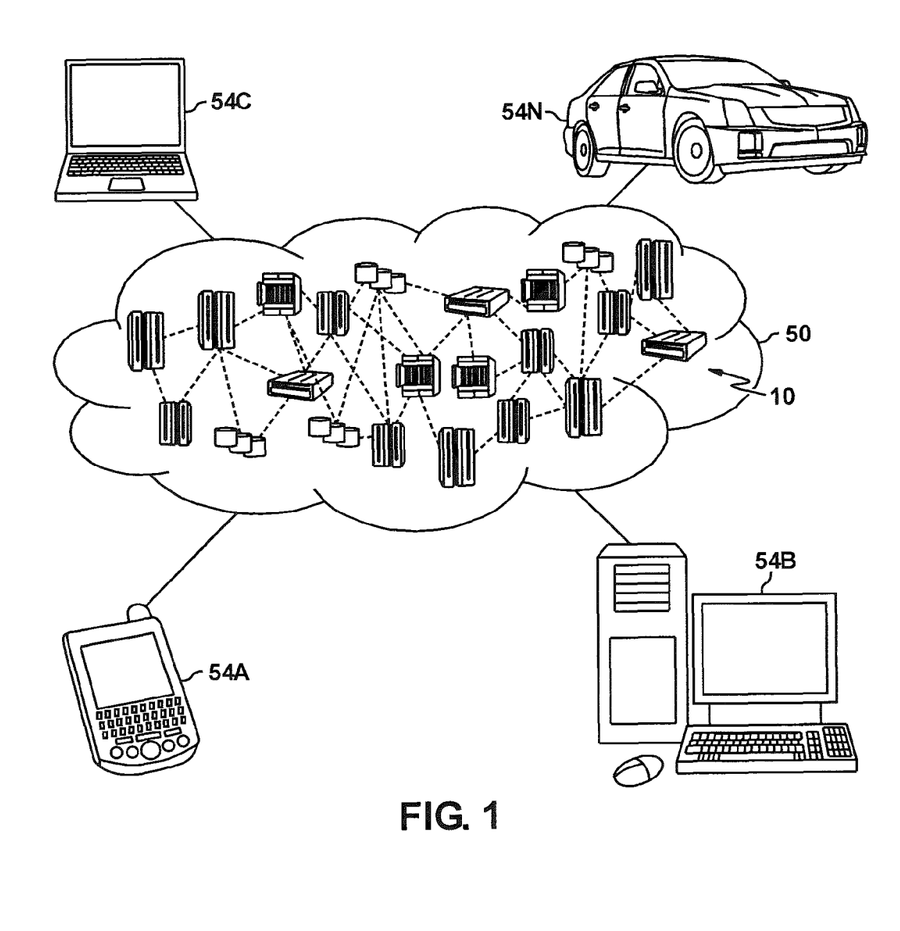
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
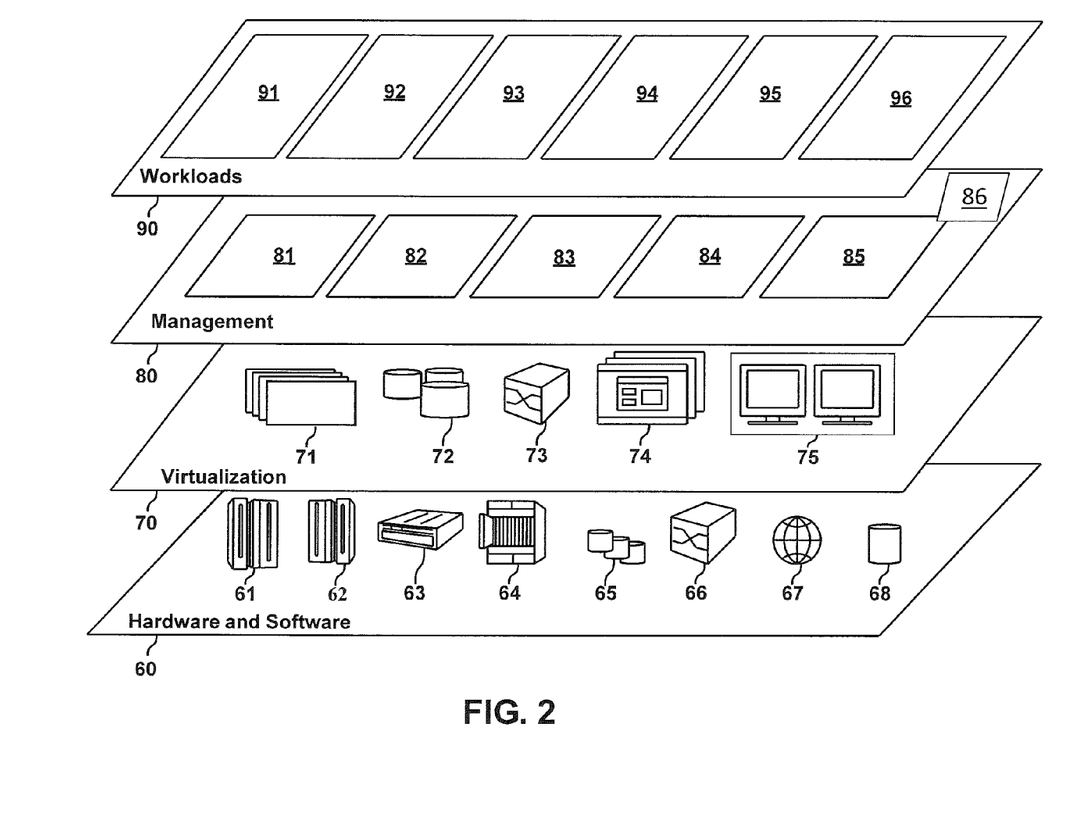
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. In an embodiment, a resource allocation application 86 is implemented within the management layer 80. The resource allocation application 86 implements processes or methods for determining and/or performing virtual machine plan generation and allocations as described herein; however, it will be understood that the application 86 may be implemented in any layer.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
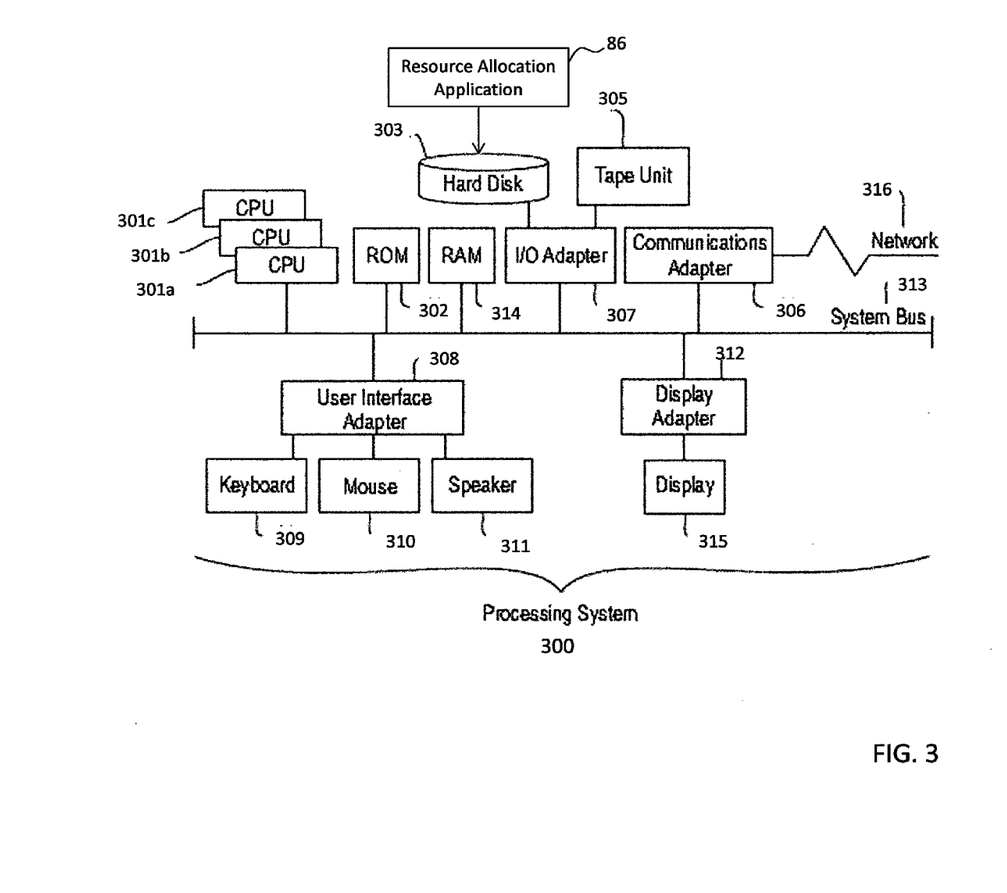
FIG. 3 depicts a block diagram of a system upon which resource allocation management may be implemented according to an embodiment of the present invention.

With reference now to FIG. 3, there is shown an embodiment of a processing system 300 for implementing the teachings herein. The system may form part of the cloud computing environment described in FIGS. 1 and 2, or may be operate, e.g., in a client/server architecture. As shown in FIG. 3, the system 300 has one or more central processing units (processors) 301a, 301b, 301c, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of system 300.

FIG. 3 further depicts an input/output (I/O) adapter 307 and a network adapter 306 coupled to the system bus 313. I/O adapter 307 may be a small computer system interface (SCSI) adapter that communicates with a hard disk 303 and/or tape storage drive 305 or any other similar component. I/O adapter 307, hard disk 303, and tape storage device 305 are collectively referred to herein as mass storage. A network adapter 306 interconnects bus 313 with an outside network 316 enabling data processing system 300 to communicate with other such systems. A screen (e.g., a display monitor) 315 is connected to system bus 313 by display adaptor 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 313 via user interface adapter 308 and display adapter 312. A keyboard 309, mouse 340, and speaker 311 all interconnected to bus 313 via user interface adapter 308, which may include, for example, a Super I/O chip integrating multiple device adapters into a single integrated circuit.

In one embodiment, the resource allocation application 86 (described in FIG. 2) may be stored by the system 300 (e.g., on the hard disk 303) and may be accessed through an operating system or hypervisor of the system 300 by one or more CPUs 301a-301c for execution. In an embodiment, the resource allocation application 86 may be part of a capacity planning module of a hypervisor.

Thus, as configured in FIG. 3, the system 30 includes processing capability in the form of processors 301, storage capability including system memory 314 and mass storage 304, input means such as keyboard 309 and mouse 340, and output capability including speaker 311 and display 315. In one embodiment, a portion of system memory 314 and mass storage 304 collectively store an operating system such as the AIX® or VM operating system from IBM Corporation to coordinate the functions of the various components shown in FIG. 3. In addition, a portion the system memory 314 or hard disk 302 may be used for the local caches described herein, with the shared storage located on a storage device accessible by the processors 301 via the network 316.

The embodiments described herein provide continual real-time evaluation of advanced virtualization capabilities across a physical and virtual infrastructure deployed within a converged infrastructure resource pool (e.g., dynamically adjusted server/storage/network capability) environment. The physical infrastructure may include, but is not limited to, servers, networks, storage, racks, and chasses all being optimally allocated by server hypervisors and other storage and network virtualization technologies.

Figure 4A:
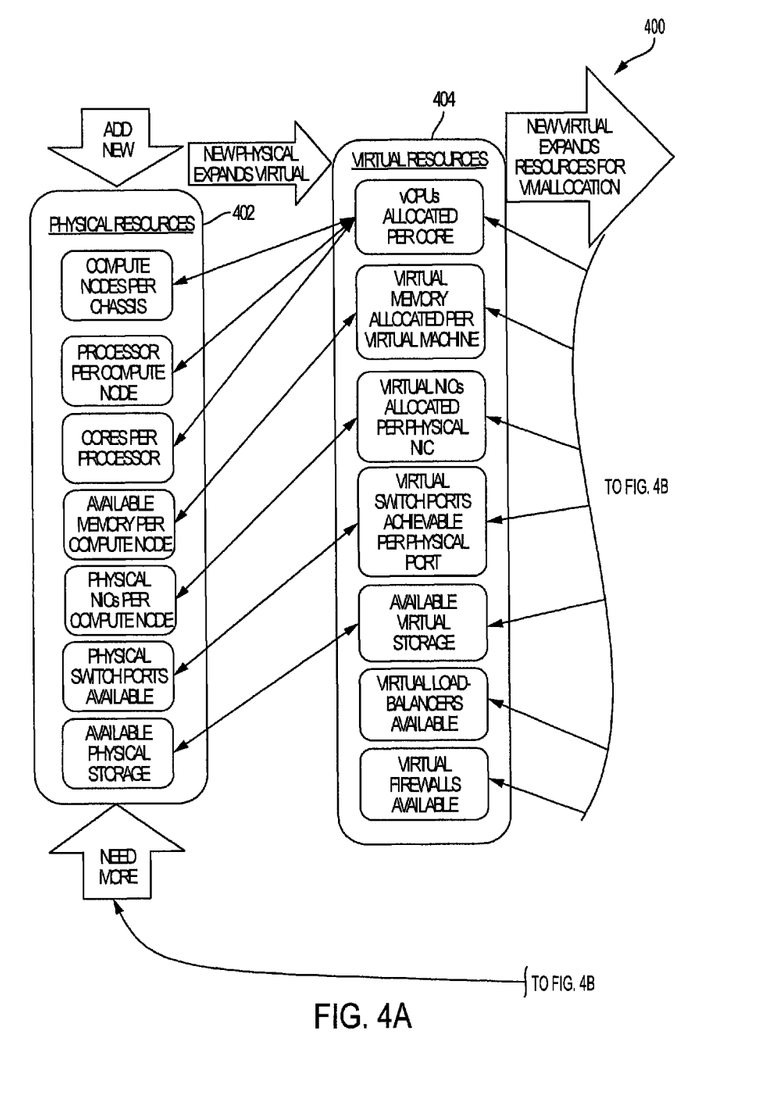
FIGS. 4A-4B depict a resource allocation model in accordance with an embodiment of the present invention.
Figure 4B:
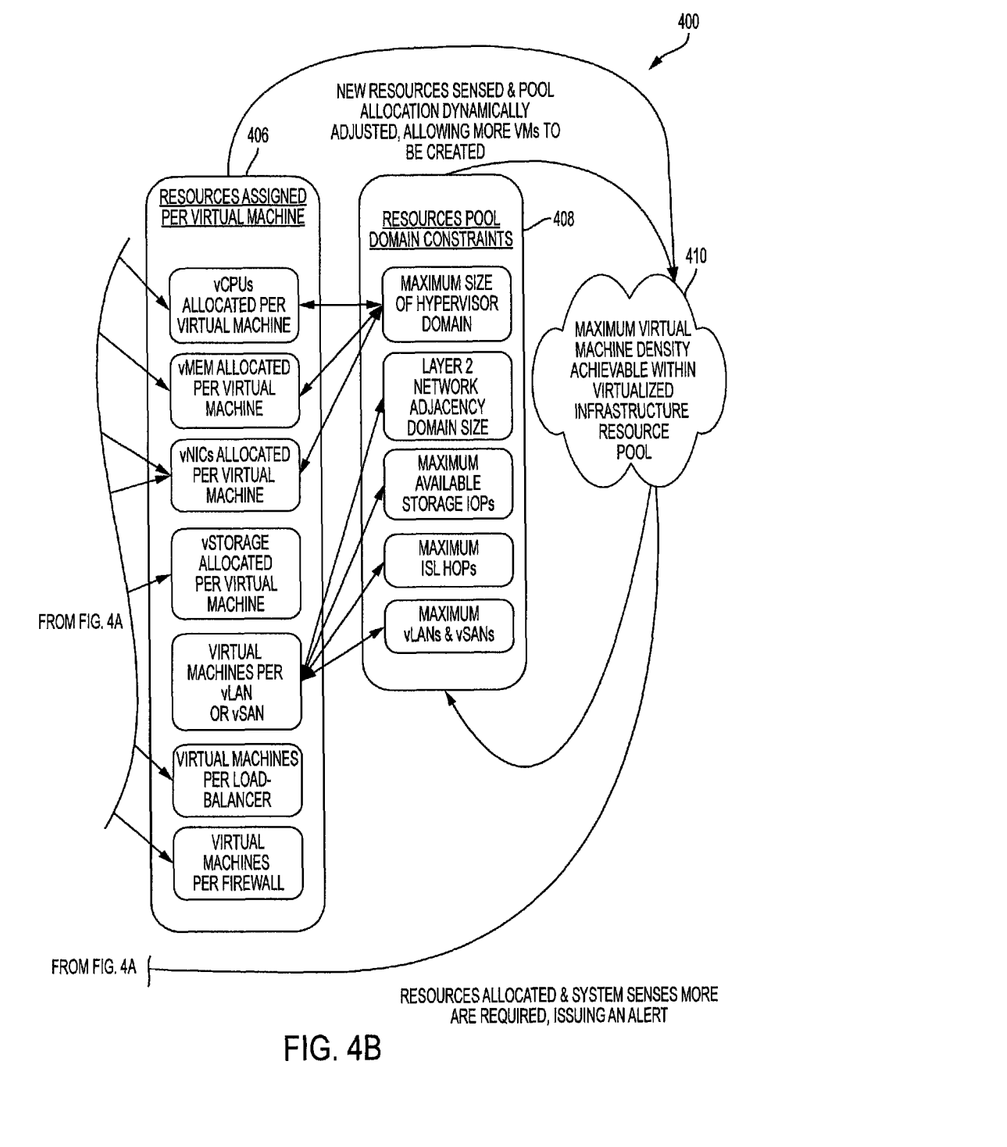

Turning now to FIGS. 4A-4B, a resource allocation model for implementing the exemplary embodiments will now be described. The resource allocation model 400 of FIG. 4 may be implemented by the resource allocation application 86. Block 402 in FIG. 4A lists the physical resources of a computer environment. In an embodiment, the resource allocation application 86, through the operating system or hypervisor, discovers these physical resources. Block 404 lists all of the virtual resources that are allocated or available for allocation. When a new physical resource is added to the computer environment, the properties of the physical resource are added to the model in block 402, which in turn expands the number of virtual resources in block 404. Likewise, when an existing physical resource is removed from the computer environment, the physical resource is removed from the model in block 402, which in turn causes the number of virtual resources to be diminished.

Modeled elements within block 402 may include a number of compute nodes per chassis in the computer environment, a number of processors per each compute node, and a number of cores per processor. As shown in FIG. 4A, based on these aspects of the physical resources (nodes, processors, and cores), allocation of virtual CPUs (vCPUs) per physical core can be performed.

Other modeled elements within block 402 include available memory per compute node, physical network interface cards (NICs) per compute node, physical switch ports available, and available physical storage. As shown in FIG. 4A, corresponding virtual allocations to these physical elements are modeled in block 404 (e.g., virtual memory allocated per virtual machine, virtual NICs allocated per physical NIC, virtual switch ports achievable per physical port, and available virtual storage, respectively).

Also shown in block 404, the model 400 lists the available software defined load balancers and available software defined virtual firewalls. It will be understood, however, that any network function virtualization elements may be implemented, e.g., VLAN gateways, IP gateways, etc.

Block 406 of model 400 in FIG. 4B lists virtual resources from block 404 that are assigned per virtual machine. As shown in FIG. 4, each of the virtual elements listed in block 404 is allocated on a per virtual machine basis. Thus, the virtual resources from block 404 are aggregated at the virtual machine level to provide a total aggregate of the available resources of the computer environment.

From the total aggregate of available resources in block 406 of FIG. 4B, the model 400 can produce a resource pool that is configured for maximum efficiency. As shown in block 408 of FIG. 4B, the process evaluates virtual resources (e.g., the vCPUs allocated per virtual machine, the virtual memory allocated per virtual machine, and the virtual NICs allocated per virtual machine in block 406) in view of a maximum size of the system hypervisor domain in block 408. If the allocation exceeds the maximum size, the process can dynamically adjust the allocation, e.g., allowing more VMs to be created. Likewise, the process evaluates the VMs per vLAN or vSAN in view of Layer 2 network adjacency domain site, maximum available storage input/output operations per second (IOPS), maximum inter-switch link (ISL) hops, and maximum vLANs and vSANs to determine whether re-allocation or adjustment is needed.

Based on these evaluations, between the elements in block 406 and the constraints in block 408 of the model 400, the system can adjust allocations in order to achieve maximum virtual machine density within the virtualized infrastructure resource pool. As shown by the by-directional arrows between elements of the blocks 402-408, re-allocation and reclamation of virtual resources can be implemented at any point in the model 400. In block 410, the maximum virtual machine density is realized (from inputs received from blocks 406 and 408).

Figure 5:
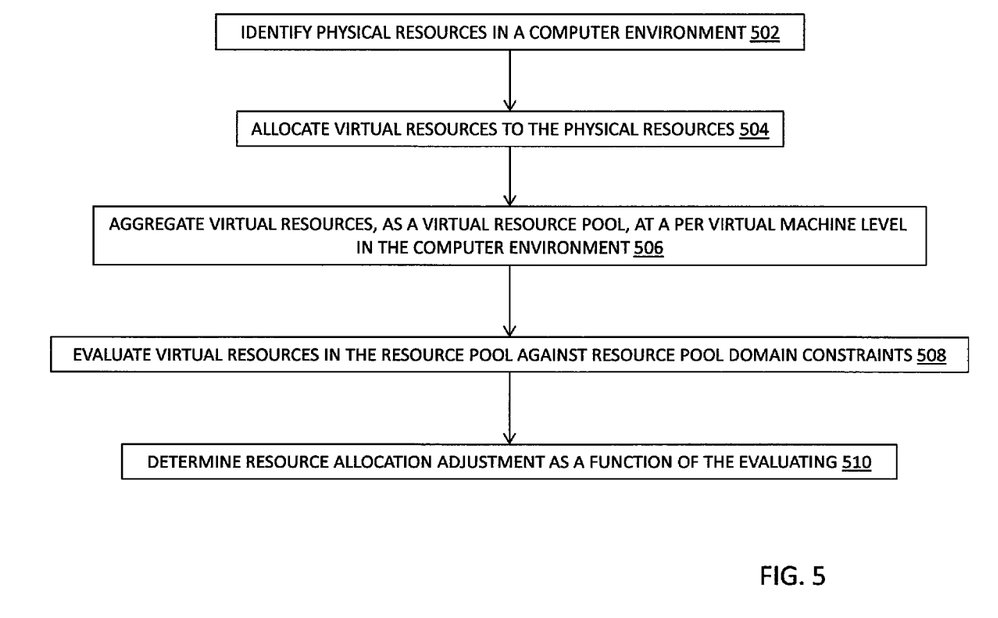
FIG. 5 depicts a flow diagram of a process for implementing resource allocation management according to an embodiment of the present invention.

FIG. 5 depicts a flow diagram of a process for implementing the resource allocation management processes. In block 502, physical resources in a computer environment are identified for a resource allocation model (e.g., FIGS. 4A-4B). These physical resources may include computing nodes per chassis/frame/resource pool, processors per computer node, cores per processor, physical memory, physical network interface cards, and physical switches and ports.

At block 504, virtual resources are allocated to the physical resources within the model. For example, allocation of the virtual resources to the physical resources includes allocating one or more of virtual CPUs per each physical core; virtual memory per available memory of each physical node; virtual network interface cards per each physical network interface card; virtual switch ports per each physical port; and available virtual storage associated with available physical storage.

At block 506, the virtual resources are aggregated, as a virtual resource pool, at a per virtual machine level in the computer environment. The virtual resource pool includes a total number of virtual resources assigned per virtual machine. The assigned virtual resources include one or more of virtual CPUs; virtual memory; virtual network interface cards; virtual storage; virtual machines per vLAN; and virtual machines per vSAN.

At block 508, the virtual resources in the resource pool are evaluated against resource pool domain constraints. The resource pool domain constraints include one or more of maximum size of hypervisor domain; Layer 2 network adjacency domain size; maximum available storage IOPs; maximum ISL hops and maximum vLANs and vSANs.

At block 510, a resource allocation adjustment is determined as a function of the evaluating, such that the resource allocation adjustment is configured to achieve a maximum specified virtual machine density. The adjustment may be one of adding a new virtual machine and reclaiming an existing virtual machine. The maximum specified virtual machine density achieves an optimum deployment of virtual machines to physical resources that is required to provide a desired level of computing performance, while minimizing costs that are otherwise attributable to inefficient use or underutilization of computer resources. The maximum specified virtual machine density can be defined by system administrators based on quantifiable performance objectives. As shown in FIG. 4, the aggregated virtual resource information from block 406, which is processed and evaluated in view of the constraints in block 408, enables the system to derive the maximum virtual machine density (block 410). In turn, this information can be fed back to block 402 in the event additional resources are determined to be needed.

In an embodiment, the model also includes available virtual load-balancers and available virtual firewalls. The aggregating step further includes aggregating a number of virtual machines per load-balancer and aggregating a number of virtual machines per firewall.

Technical effects and benefits include the ability to control virtual machine (VM) density and placement distribution within a converged infrastructure resource pool. Existing methods for determining or controlling the sizing of individual VMs has focused on one set of physical resource characteristics from within infrastructure siloes. The embodiments described herein provide an infrastructure and methodology for calculating VM placement, VM size distribution, and VM density based on an automated algorithm that senses the combined physical and virtual resource capacity within a converged infrastructure resource pool.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method, comprising:
identifying physical resources in a computer environment;
allocating virtual resources to the physical resources;
aggregating the virtual resources, as a virtual resource pool, at a per virtual machine level in the computer environment, wherein the virtual resource pool includes a total number of virtual resources assigned per virtual machine, wherein aggregating the virtual resources further comprises aggregating a number of virtual machines per load-balancer and aggregating a number of virtual machines per firewall;

evaluating the virtual resources in the virtual resource pool against resource pool domain constraints, wherein the resource pool domain constraints comprise a maximum size of a hypervisor domain, a Layer 2 network adjacency domain size, a maximum available storage input/output operations per second value, a maximum inter-switch link hops value, a maximum number of virtual LANs, and a maximum number of virtual SANs; and determining a resource allocation adjustment as a function of the evaluating; and adjusting the virtual resources based on the resource allocation adjustment to a desired level of computing performance based on quantifiable performance objectives, wherein the desired level of computing performance is a maximum specified virtual machine density.

2. The method of claim 1, wherein the allocating the virtual resources to the physical resources includes allocating at least one of:

virtual CPUs per each physical core;
virtual memory per available memory of each physical node;
virtual network interface cards per each physical network interface card;
virtual switch ports per each physical port; and
available virtual storage associated with available physical storage.

3. The method of claim 1, wherein the virtual resource pool further includes a total number of virtual resources assigned per virtual machine, the assigned virtual resources including at least one of:

virtual CPUs;
virtual memory;
virtual network interface cards;
virtual storage; and
virtual machines per virtual SAN.

4. The method of claim 1, wherein the resource pool domain constraints include at least one of:

maximum size of a hypervisor domain;
Layer 2 network adjacency domain size;
maximum available storage input/output operations per second;
maximum inter-switch link hops; and
maximum virtual LANs and virtual SANs.

5. The method of claim 1, wherein the resource allocation adjustment includes adding a new virtual machine.

6. The method of claim 1, wherein the resource allocation adjustment includes reclaiming an existing virtual machine.

* * * * *